Nov. 9, 1965    W. T. WILLIAMS    3,217,069
METHOD OF MOULDING CEMENT ARTICLES
Filed March 2, 1962    4 Sheets-Sheet 1
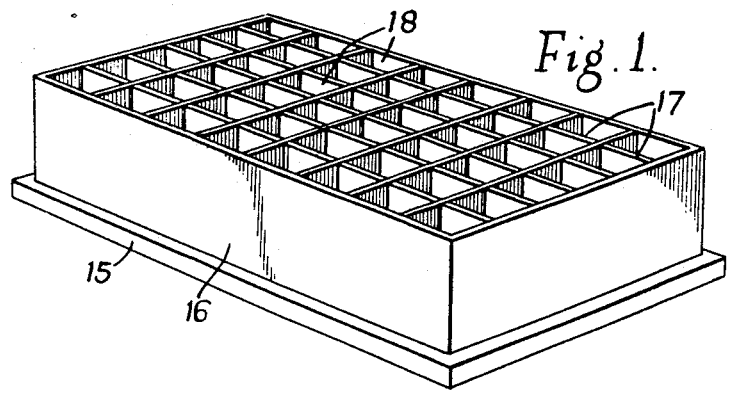
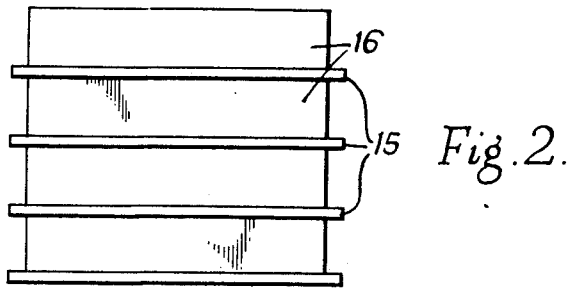
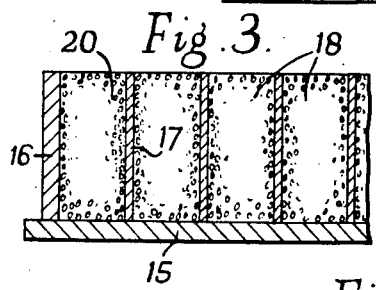
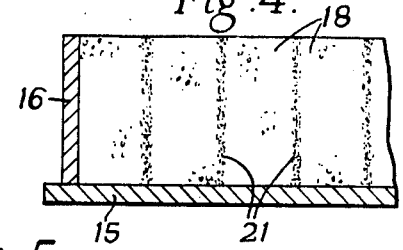
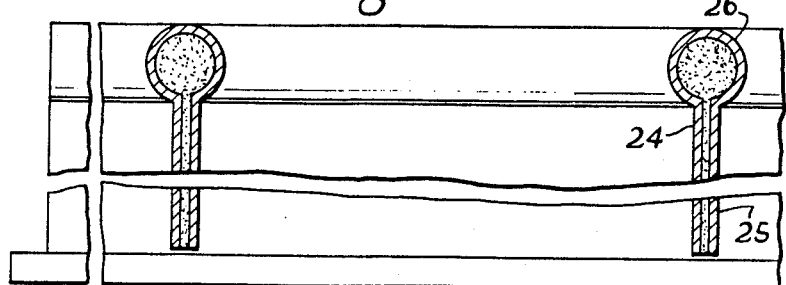
INVENTOR
William Thomas Williams
BY
Alexander McDowell
ATTORNEYS Nov. 9, 1965  W. T. WILLIAMS  3,217,069
METHOD OF MOULDING CEMENT ARTICLES
Filed March 2, 1962  4 Sheets-Sheet 2

INVENTOR
William Thomas Williams
BY
ATTORNEYS

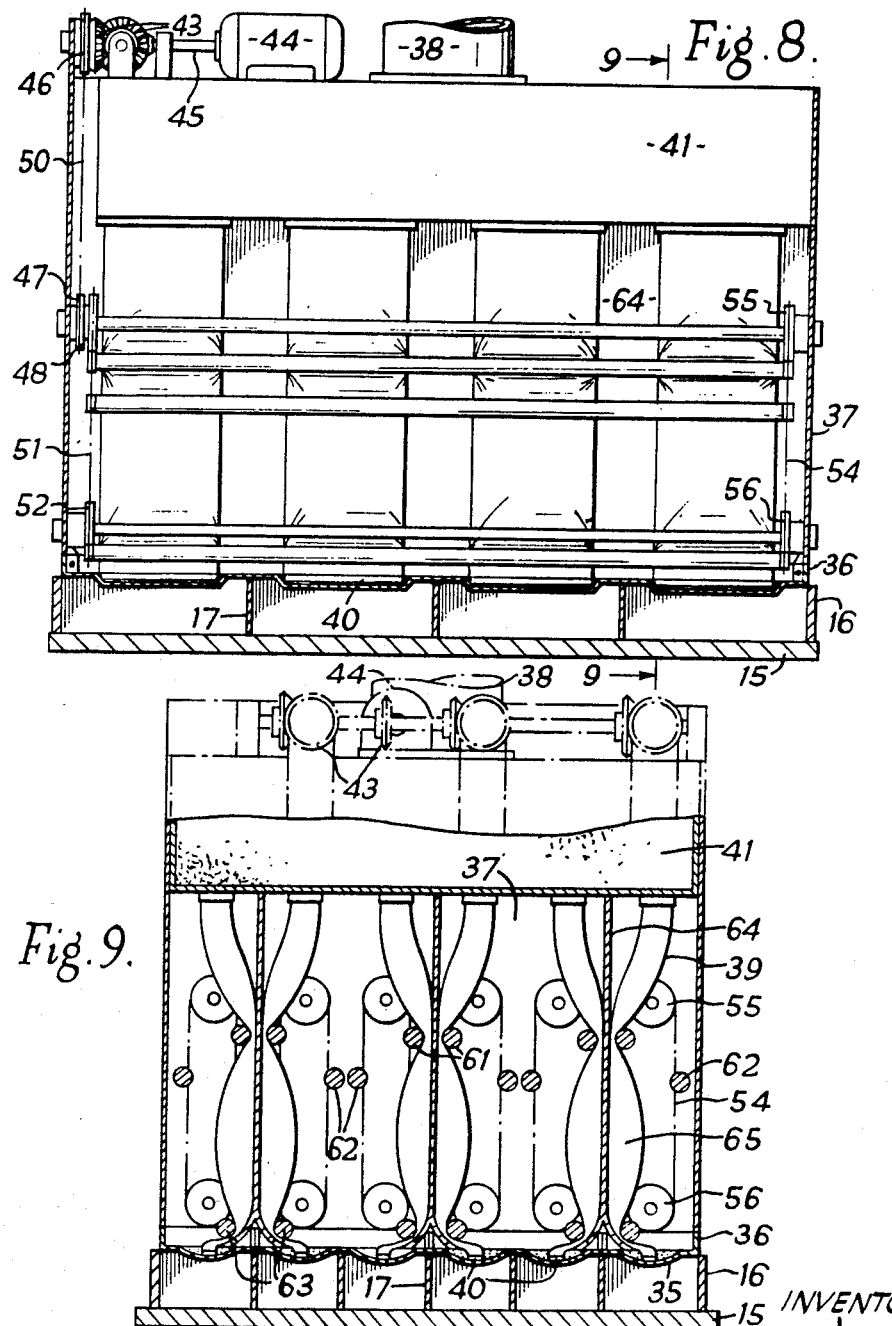

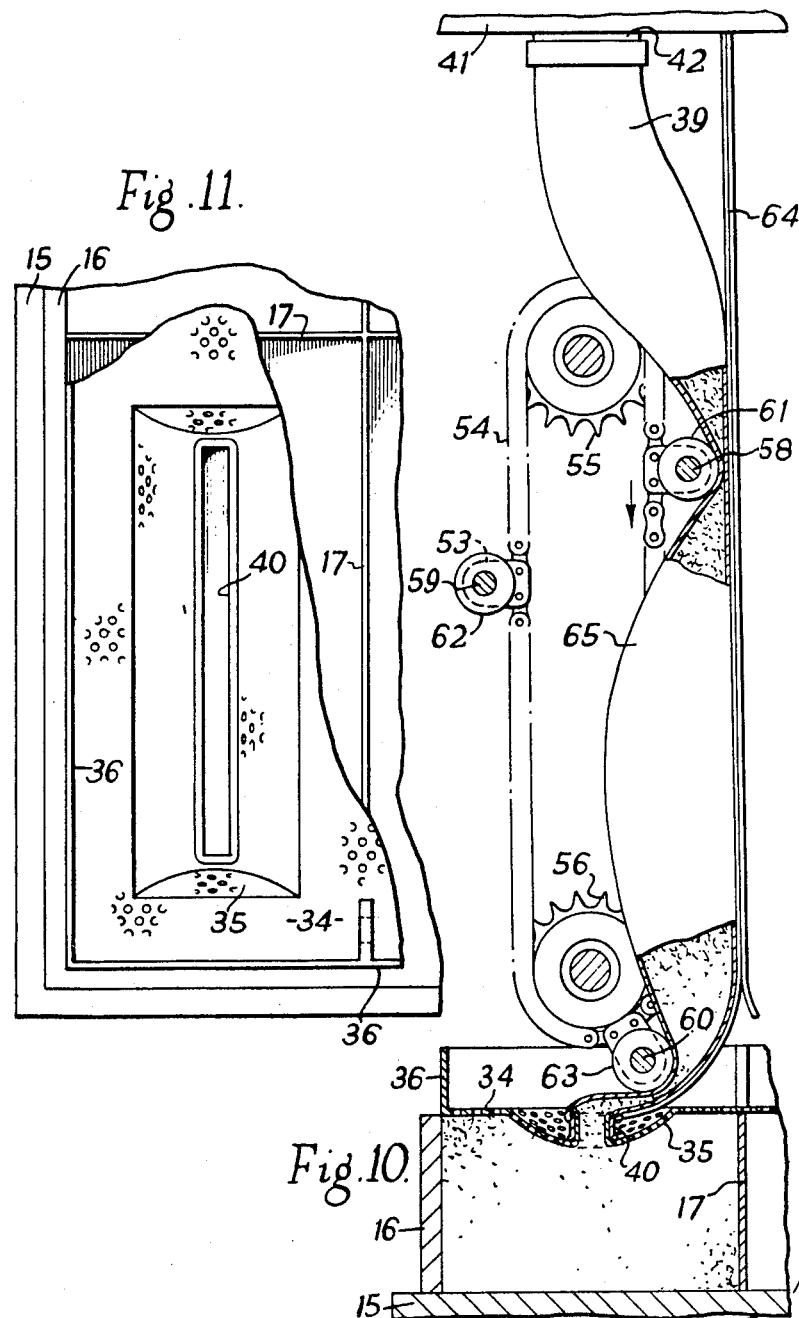

3,217,069
METHOD OF MOULDING CEMENT ARTICLES
William Thomas Williams, Battle, England, assignor to Brixite Limited, Brighton, England
Filed Mar. 2, 1962, Ser. No. 177,056
Claims priority, application Great Britain, Mar. 8, 1961, 8,537/61; Nov. 25, 1961, 42,250/61
8 Claims. (Cl. 264—42)

The present invention is concerned with the moulding of bricks, building blocks and other shaped articles from liquid settable materials including concrete mixes, metals and synthetic plastics.

It is the present practice in the manufacture of concrete bricks, building blocks or the like to introduce the mix into a mould, the bricks or the like being left in the mould until the mix has set sufficiently to allow the bricks to be handled. It will be appreciated therefore that each mould will be occupied over a substantial period of time, usually in the region of from twelve to twenty-four hours, during which time the mould is virtually idle. Consequently, to ensure a reasonably good and economic output it is necessary to use a large number of comparatively expensive moulds.

The chief object of the invention is to expedite the moulding of shaped articles and to reduce the material and cost required for the moulds for a given rate of production.

In carrying out the present invention use is made of a mould in the form of a cellular structure or incorporating separating members dividing the mould into a series of compartments of the appropriate shape and size to produce a large number of articles in each moulding operation.

According to the present invention the method comprises filling a mould with said material, said composition being divided into separate article shapes by solid partitions, replacing said partitions by areas of weaker material, setting the shapes to solid articles, and breaking the articles apart from each other.

Various ways of carrying the invention into effect will now be described by way of example with reference to the accompanying diagrammatic drawings wherein:

FIGURE 1 is a perspective view of a mould with partitions;

FIGURE 2 is a front elevation of stacked moulds;

FIGURES 3 and 4 are sectional views of the mould illustrating one way of carrying out the invention;

FIGURE 5 is a sectional view of the mould showing another way of carrying out the invention;

FIGURE 8 is a sectional view of a mould filling apparatus;

FIGURE 9 is a sectional view on line 9—9 on FIGURE 8;

FIGURE 10 is an enlarged view of part of FIGURE 9; and

FIGURE 11 is a plan view of part of the mould and mould cover shown in FIGURES 9 and 10.

Figure 6:
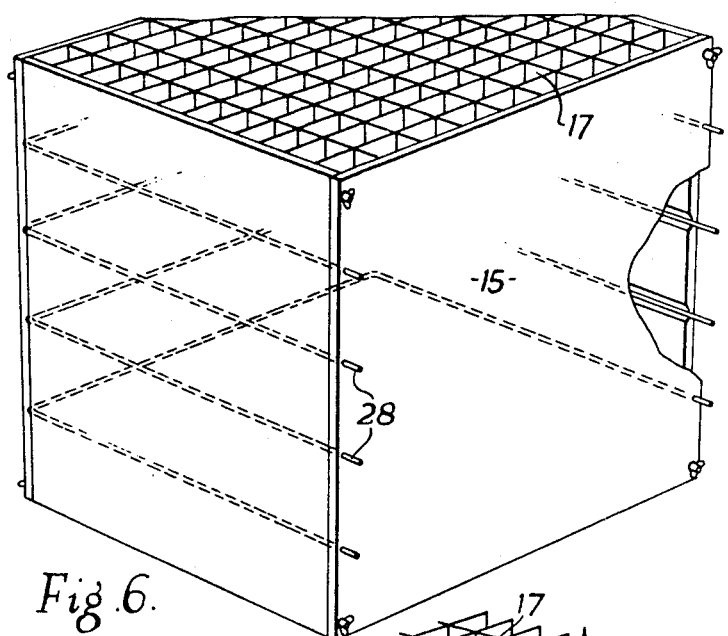
FIGURES 6 and 7 are perspective views of modified forms of mould showing still other modes of carrying out the invention.

Referring first to FIGURES 1 to 4 a mould is provided comprising a board or pallet 15 on which a frame 16 is loosely placed, and a cellular partition device 17 is placed within the frame to divide it into separate cells 18 having a shape and size suitable for the bricks or other articles to be produced. These cells are then filled with an aqueous concrete mix containing an aerating or foaming agent. The proportions of cement and ballast may be any usual proportions. The aerating or foaming agent may be any well known commercially available foaming material such as "Aphrosol" (Imperial Chemical Industries Limited), or "Phomene" (Pyrene Limited), or "DTR 4" (Shell Oil Company), or even a detergent such as "Daz" or "Tide." Bubbles of air tend to collect at the surfaces of the partitions as at 20 (FIGURE 3). The partitions are lifted out of the frame 16 while the composition is still liquid and the liquid composition replaces the partitions.

It is found that by removing the mould before setting has commenced, the air or gas cells lying adjacent the surfaces of the bricks in contact with the dividing parts of the mould will be attracted and part broken, the individual bricks being separated by a dividing layer of air which segregates the bricks and prevents their contacting one another and sticking together during setting, the breaking of the cells providing a sufficiently rough surface on the bricks to ensure a good key for the mortar or cement. The bricks are thus separated by layers 21 (FIGURE 4), which contain a greater proportion of air than the remainder of the composition. Another pallet 15 is placed on the frame 16 and the former procedure is repeated whereupon still another pallet is added and so on until a stack is formed as shown in FIGURE 2. This stack is then left for 24 to 48 hours during which the bricks may be subjected to a steam or other type of curing operation. The stack is then taken down and the composition now set is broken along the planes 21 into the separate bricks.

Good results have been obtained with a mould divided into a large number of brick moulding compartments by metal partitions 17 having a thickness of approximately one-sixteenth of an inch.

If desired, the partitions may be coated with foaming material, the concrete poured and the partitions removed almost immediately. This again leaves weakened planes for breakage.

In the modification illustrated in FIGURE 5 the partitions are formed of double walls 24, 25 open at their lower ends and connected at their upper ends to form a tube 26. The tubes can be all connected together and filled with a foaming agent or a solution containing a foaming agent. When the partition is removed layers of the agent or solution are left in the composition to form the weakened planes.

If desired, as shown in FIGURE 6, the mould frame 16 may be deep enough to be divided into bricks both vertically and horizontally by planes which cross each other. Thus the partitions 17 extend vertically throughout the depth of the frame 15. Three walls of the frame 16 are grooved on their inner surfaces to receive flexible tubes 28 at the different levels where weakened planes are required. As the partitions 17 are removed vertically the tubes 28 are successively pulled through the composition. The trailing edges of the tubes are perforated and foaming material is ejected from the tubes to form the horizontal weakening planes. The tubes can be pulled at the right hand ends while the foaming material is pumped into the tubes at their left hand ends.

Figure 7:
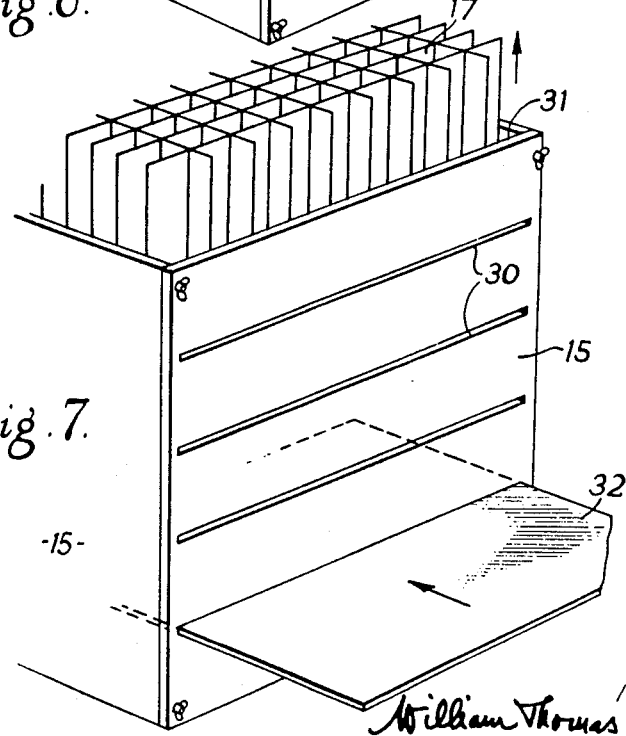

As shown in FIGURE 7 the tubes may be replaced by metal sheets 32 inserted through slots 30 in the front wall of the frame 16 progressively as the partitions 17 are lifted out of the frame. Sheets of rubber may be fixed on the front of the frame 15 slit at the slots to allow introduction of the sheets and prevent exit of concrete.

Referring now to FIGURES 8 to 11 apparatus is shown whereby predetermined measured quantities of the composition can be filled respectively into the cells of the mould 15. A perforated spreader plate 34 is welded on the top of the partitions. This plate allows air to escape and the raising of the plate without disturbing the concrete and produces a pleasant stippled pattern on the surfaces of the bricks and which also provides a key for mortar. The plate 34 is shaped at 35 to form the frogs in the bricks. The plate 34 carries filling nozzles 40 one for each mould cell and extending lengthwise of the brick centrally thereof over more than half the length of the brick.

The frame 37 carries a tank 41 at the upper part thereof. This tank has an entrance pipe 38 for the composition to be moulded into bricks and in the bottom plate of the tank there are discharge nozzles 42, one for each mould cell. Secured to these nozzles respectively are the upper entrance ends of flexible containers 39, e.g., rubber bags or tubes, the lower exit ends of which are secured to the nozzles 40.

On the supply tank is mounted an electric motor or compressed air driven device 44 which drives shafting 45 which, in turn, drives a series of pinions 46 through gearing 43 all located on one side of the frame. At a lower level the frame 37 carries series of pairs of pinions 47, 48, the first of which (for each pair) is driven by pinion 46 through an endless chain 50 while the pinion 48 carries an endless chain 51 running on an idler pinion 52 carried by the lower part of the frame 37. On the other side of the frame there are a series of endless chains 54 running over pinions 55, 56. Rods 58, 59, 60 are secured by brackets 53 to the chain 51 at one side and to the chain 54 at the other side and carry rollers 61, 62, 63. Between each adjacent pair of containers 39 is a flat metal partition 64.

Each container 39 has a set of rollers associated therewith. As the chains are driven two rollers (e.g., 61, 63, FIGURE 10) squeeze the container 39 and flatten it against the partition 64 so as to segregate a predetermined measured quantity of composition in the space 65. With continued movement the roller 63 moves away from the container and roller 61 presses the contents of the space 65 through the nozzle 40 into the mould cell while the roller 62 meanwhile closes the upper part of the container and segregates a further measured quantity of composition between the rollers 62 and 61.

Thus a mould 16 containing the partitions covered by the plate 35 is placed under the apparatus and fixed in position, the apparatus is operated through one cycle to fill all the mould cells, and the mould is removed leaving the partitions 17 on the mahcine.

For the purpose of the present invention speed of production can be achieved by removing the partitions from the composition while the latter is liquid. It is not desired to have the composition set to a putty-like or cheese-like consistency. The partitions may be removed just as soon as the concrete is filled into the mould.

I claim:

1. A method of making articles from settable cementitious liquid compositions comprising introducing a foaming material into the composition, pouring the composition into a mold, providing areas of weakness through the composition by moving parting members through and out of the composition while the composition is still liquid, thereby leaving the whole of the mold filled with the same kind of foamed cementitious composition while the areas of weakness are constituted solely by a greater quantity of gas spaces in the substance of the composition, allowing the composition to set, and breaking the articles apart from each other along said areas of weakness.

2. A method of making articles from settable cementitious liquid composition comprising aerating the composition by introducing therein a foaming material, pouring the composition into a mold containing partitions where air bubbles collect at the surface of the partitions, removing said partitions while the composition is still liquid whereby areas of weakness are formed by a greater proportion of bubbles in the spaces vacated by the partitions and the mold is otherwise filled solely by said composition, allowing the shaped articles defined by said areas of weakness to set, and breaking the articles apart from each other along said areas of weakness.

3. A method of making articles from settable cementitious liquid compositions comprising introducing a foaming material into the composition, pouring the composition into a mold having partitions in the form of a grid, lifting out the grid while the composition is liquid to form areas of weakness and the mold is otherwise filled solely by said composition, allowing the composition to set, and breaking the articles apart from each other along said areas of weakness.

4. A method of making articles from settable cementitious liquid compositions comprising introducing a foaming material into the composition, pouring the composition into a first mold containing a plurality of vertically disposed partitions, providing areas of weakness through the composition by removing said partitions while the composition is still liquid and the mold is otherwise filled solely by said composition, placing a sheet of material over the block of articles so formed, placing a second mold containing vertically disposed partitions on said block before the latter has set, pouring in the composition containing foaming material, removing the partitions from the second block so formed while the composition is still liquid, allowing the blocks to set, and breaking the articles of each block apart from each other along the lines of weakness.

5. A method of making articles from settable cementitious liquid compositions comprising introducing a foaming into the composition, pouring the composition into a mold, providing areas of weakness through the composition by moving parting means therethrough while said composition is still liquid and the mold is otherwise filled solely by said composition, allowing the shaped articles defined by said areas of weakness to set, and breaking the articles apart from each other along said areas of weakness.

6. A method of making articles from settable cementitious liquid compositions comprising introducing a foaming material into the composition, pouring the composition into a mould, providing a first series of parallel areas of weakness by moving a series of parting means through the composition in one direction while the composition is still liquid, providing a second series of parallel areas of weakness in planes at right angles to said first series by moving parting means through the composition in a second direction while the composition is still liquid, said mold being solely filled with said foamed composition, allowing the shaped articles defined by said areas of weakness to set, and breaking the articles apart from each other along said areas of weakness.

7. A method of making articles from settable cementitious liquid compositions comprising introducing a foaming material into the composition, pouring the composition into a mold, inserting a series of vertically disposed partitions into said composition, removing said partitions from said composition while the latter is still liquid in order to provide areas of weakness through the composition, said mold being solely filled with said foamed composition, allowing the shaped articles defined by said areas of weakness to set, and breaking said articles apart from each other along the areas of weakness.

8. A method of making articles from settable cementitious liquid compositions, comprising introducing a foaming material into the composition, supplying measured quantities of the composition separately and simultaneously into cells provided within a mold, said cells being formed by removable partitions, providing areas of weakness through the composition by removing said partitions while the composition is still liquid, said mold being solely filled with said foamed composition, allowing the articles defined by the areas of weakness to set, and breaking the articles apart from each other along the areas of weakness.

References Cited by the Examiner

UNITED STATES PATENTS

| | | | |
|---|---|---|---|
| 943,966 | 12/09 | Brandell | 25—417 |
| 965,150 | 7/10 | Atterbury. | |
| 1,343,572 | 6/20 | Lynde. | |
| 1,552,711 | 9/25 | Lane. | |
| 1,768,922 | 7/30 | Oliver | |
| 1,901,057 | 3/33 | Roos | 106—87 |
| 2,206,985 | 7/40 | Vogt | 222—101 |
| 2,673,011 | 3/54 | Rood et al. | 222—214 |
| 2,681,751 | 6/54 | Stone et al. | 222—214 |
| 2,865,537 | 12/58 | Jackson | 222—214 |
| 2,898,220 | 8/59 | Ulfstedt et al. | 106—87 |
| 2,901,808 | 9/59 | Muehleck et al. | 25—2 |
| 3,032,850 | 5/62 | Russell. | |

FOREIGN PATENTS

| | | |
|---|---|---|
| 277,510 | 2/60 | Australia. |
| 702,992 | 1/54 | Great Britain. |

ROBERT F. WHITE, *Primary Examiner.*

ALEXANDER H. BRODMERKEL, *Examiner.*